United States Patent [19]

Greten et al.

[11] Patent Number: 4,850,848

[45] Date of Patent: Jul. 25, 1989

[54] CONTINUOUSLY OPERATING PRESS

[75] Inventors: Berndt Greten; Günter Seeger, both of Springe, Fed. Rep. of Germany

[73] Assignee: Bison-Werke Baehre & Greten GmbH & Co. KG, Springe, Fed. Rep. of Germany

[21] Appl. No.: 177,706

[22] Filed: Apr. 5, 1988

[30] Foreign Application Priority Data

Apr. 14, 1987 [DE] Fed. Rep. of Germany ....... 3712634

[51] Int. Cl.[4] ............................................ B29C 43/48

[52] U.S. Cl. ..................................... 425/371; 100/151

[58] Field of Search ................... 425/371, 370, 364 R, 425/372; 100/151

[56] References Cited

U.S. PATENT DOCUMENTS

| | | | |
|---|---|---|---|
| 2,046,047 | 6/1936 | Watkins | 100/151 |
| 2,135,763 | 11/1938 | Nicholson | 100/151 X |
| 2,909,804 | 10/1959 | Means | 100/151 X |
| 3,512,474 | 5/1970 | Malarkey, Jr. | 100/151 X |
| 3,532,050 | 10/1970 | Carlsmith | 100/151 X |
| 3,594,866 | 7/1971 | Skinner et al. | 425/371 X |
| 3,970,515 | 7/1976 | Busker | 100/151 X |
| 4,420,299 | 12/1983 | De Mets | 425/371 X |
| 4,565,509 | 1/1986 | De Mets | 425/371 X |
| 4,645,632 | 2/1987 | Bottger et al. | 425/371 X |

FOREIGN PATENT DOCUMENTS

| | | | |
|---|---|---|---|
| 128968 | 6/1983 | European Pat. Off. . | |
| 128968 | 6/1983 | European Pat. Off. . | |
| 2224977 | 12/1972 | Fed. Rep. of Germany . | |
| 2421296 | 11/1975 | Fed. Rep. of Germany . | |
| 3334584 | 4/1985 | Fed. Rep. of Germany | 100/151 |

*Primary Examiner*—Richard L. Chiesa

*Attorney, Agent, or Firm*—Townsend & Townsend

[57] ABSTRACT

A continuously operating press is described in which endless bands are moved with constant speed around an upper and a lower press platten and a lubricant film is formed between the confronting press platten surfaces and the respectively associated endless band. The fluid which serves for the build up of the lubricant film is kept in this arrangement under a predeterminable hydrodynamic pressure in at least one press zone at the input side of the press, while a calibration zone is provided at the output side of the press in which the lubricant stands substantially only under static pressure.

8 Claims, 1 Drawing Sheet

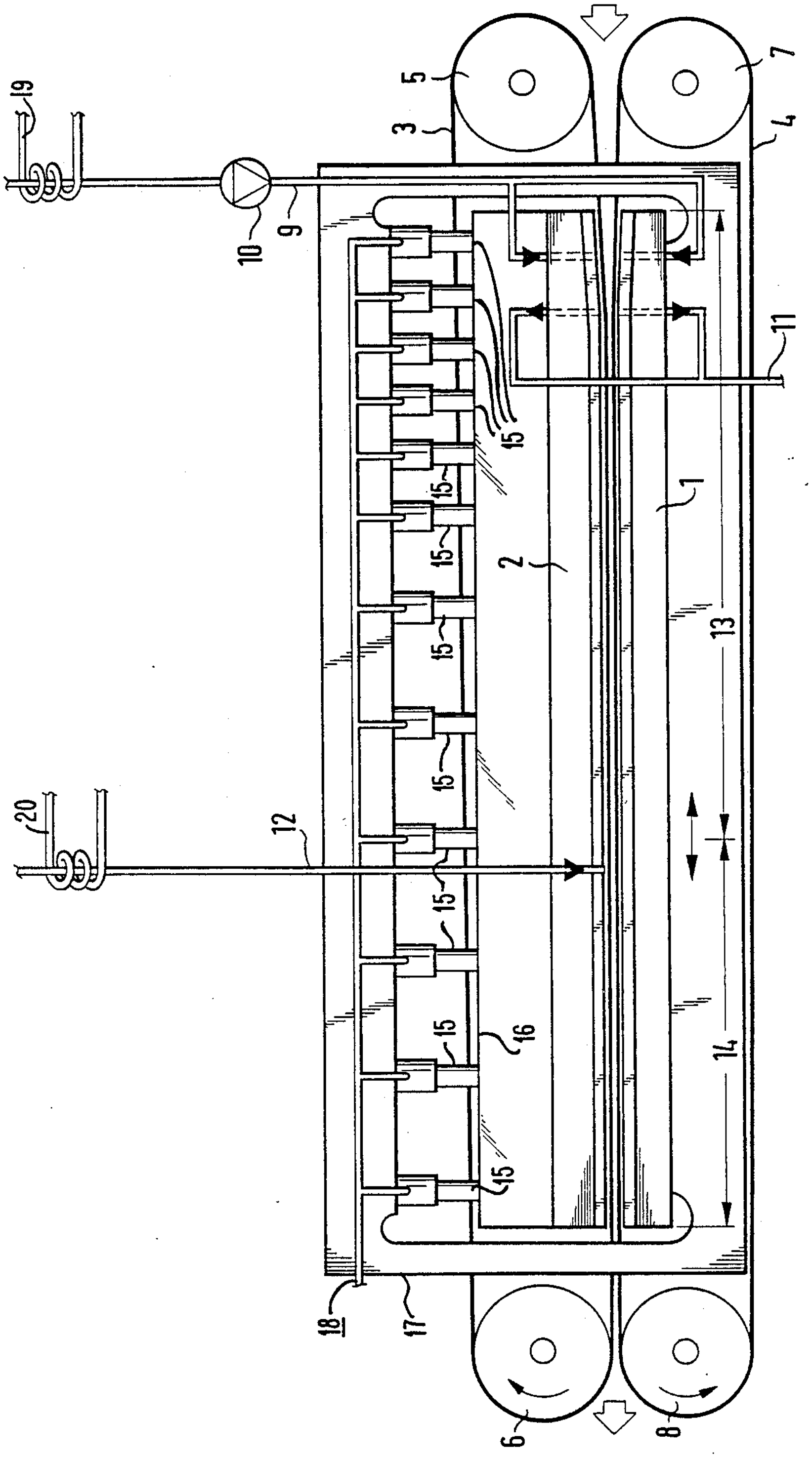
1
2
3
4
5
6
7
8
9
10
11
12
13
14
15
16
17
18
19
20

CONTINUOUSLY OPERATING PRESS

BACKGROUND OF THE INVENTION

The invention relates to a continuously operating press preferably for the manufacture and/or coating, veneering or the like of a one layer or multilayer web of raw material and/or predetermined material, in particular of a fleece of particles containing lignocellulose and/or cellulose, such as wood chips, wood fibres, paper clippings and paper fibre or the like, and at least one binder disposed therein.

In one press of this kind which is known from the European patent specification No. 0128968, the press comprises a lower press platen; an upper press platen adjustable relative to the lower press platen and capable of being set under pressure; an endless belt guided around the lower platen and an endless belt guided around the upper platen, with the bands each being drivable at the same speed; and an arrangement for building up and maintaining a lubricant film between the confronting press platen surfaces and the respectively associated endless bands.

This known press, termed a "hydrodyne press" has proved its usefulness many times in practice, it not only makes it possible to manufacture the most diverse board-like products in continuous operation, but is also characterized by high economy and simultaneously by high accuracy.

SUMMARY OF THE INVENTION

In order to increase the upper performance limit of such presses, which is to a certain extent set by the system, it is the object of the present invention to make even more rapid operation of the press possible while maintaining as far as possible the accuracy of the finished product, i.e. while ensuring practically negligible tolerances, and indeed in particular with products in which inorganic binders (for example gipsum, cement, fly ash, pozzuolana) are added to the particular fleece as a binder.

In order to satisfy this object the present invention provides that the fluid which serves to build up the lubricant film is held under a predeterminable hydrodynamic pressure in at least one press zone disposed at the input side of the press; and that a calibration zone in which the lubricant stands at least substantially only under static pressure is provided at the output side of the press.

Surprisingly the provision of a press output side calibration zone which stands only under static lubricant pressure has led to a further reduction of the manufacturing tolerances, i.e. to a substantial improvement of the end product. In many applications tolerances of $\pm 6/100$ mm can be achieved. This is probably a consequence of the fact that in this calibration zone the desired thickness can be very accurately predetermined with pressure differences occurring during hydrodynamic operation having no influence on the accuracy of the finished product. Moreover, the particular fleece being pressed has the possibility of breathing for a sufficient length of time in the calibration zone, i.e. to expand to the desired thickness even in those regions which are possibly still somewhat recessed in the form of valleys after leaving the hydrodynamic pressure zone. As a result of this it is also possible to accelerate the throughput speed of the press.

It is of particular advantage that the various press zones which are hydrodynamically or only hydrostatically loaded can also each be controlled thermally in accordance with the ideal circumstances for the relevant product. Accordingly it is possible either to provide a thermal surge in the product to be pressed only at the press input side, or to provide thermal surges of different sizes in the hydrodynamic zone on the one hand and in the hydrostatic zone on the other hand. In particular waste energy which has occurred in previous processing stages can in particular be advantageously used, such as for example the thermal energy which arises during the generation of ice crystals which are mixed with the fleece particles when using gypsum as a binder (German patent application P No. 37 08 874.2).

By the provision of a very accurate calibration zone, in particular a calibration zone which is not influenced by any form of disburbing pressure fluctuations of the lubricant, the particular product can be appropriately pressed in the preceding press zones in which the operation is carried out with hydrodynamic pressure, with the desired end accuracy of the particular board being obtained in the subsequent calibration zone independently of whether the desired dimension or a reduced dimension is sought in the preceding press zone.

It is furthermore of advantage that the variability which can be achieved without any particular effort with regard to the particular size of the hydrodynamic and hydrostatically loaded zones, and the possibility of differentially thermally loading these zones, gives a higher degree of adaptability with respect to the materials to be processed or pressed. E.g. if fluid is used to form a towed oil film in the calibration zone, then this fluid can be heated independently of the fluid which stands under hydrodynamic pressure at the press input side. Equally, differentially heated and optionally cooled lubricating oil can be supplied to the ndividual press zones.

In a first advantageous embodiment the lubricant film in the calibration zone is formed by a towed oil film fed at least partly from the preceding press zone.

Moreover, the fluid which generates the hydrodynamic pressure is preferably guided in an at least substantially closed circuit.

In a particularly preferred embodiment the fluid which is supplied to the calibration zone and which stands at least substantially under only static pressure is supplied separately from the hydrodynamic fluid circuit.

A further press zone can be advantageously provided between the press zone standing under hydrodynamic pressure at the press input side and the calibration zone at the press output side, and has a reduced hydrodynamic pressure in comparison to the hydrodynamic pressure at the input side.

Particularly favourable control is possible of the boundary between the hydrodynamic press zone and the hydrostatic calibration zone in the press by controlling the lubricant supply.

BRIEF DESCRIPTION OF THE DRAWING

The single drawing shows a continuous press, according to the present invention.

DETAILED DESCRIPTION OF THE PREFERRED EMBODIMENT

An embodiment of the invention will now be described with reference to the drawing, the single FIG- URE of which shows a schematic representation of a continuously operating press in accordance with the invention.

In accordance with the drawing the continuous press includes a stationary press table 1 and a vertically adjustable press platen 2 and also endless steel bands 3, 4 which are guided over deflection rollers 5, 6 and 7, 8 respectively and are moved with the same speed along the confronting surfaces of the press table 1 and the press platen 2. In order to make sliding of the steel bands 3, 4 along the press table (lower press platen 1) and along the upper press platen 2 possible, lubricant is supplied to these platens so that a full area slide film is formed. The extraction of the lubricating oil takes place via suitably provided openings in the press table 1 or in the press platen 2 and also at the edges of the press surfaces.

The supply of lubricant at the input side to the press takes place via at least one schematically illustrated line 9, and indeed under the action of a pump 10 which generates the hydrodynamic pressure required in the press zone 13.

The return of the lubricant oil from the press zone 13 takes place via a line 11 which is only schematically illustrated, with the lubricant oil preferably being guided in the circuit. I.e. oil drained or extracted via the line 11 is returned to a sump (not shown) and ultimately to the pump 10 which draws oil from the sump, usually via a heat exchanger 19 which may be supplied with waste heat, e.g. from the ice making plant referred to earlier. Alternatively the heat exchanger can be positioned in the sump. The entire press zone 13 can be oil lubricated in accordance with this hydrodynamic pressure principle.

The calibration zone 14 then adjoins this press zone 13 and, as a double arrow indicates, the size of the press zone 13 and of the calibration zone 14 can be made variable in order to take account of the particular requirements for the product being manufactured.

In the calibration zone 14 the lubricant has essentially only static pressure and the lubricant oil required for this calibration zone can originate wholly or partly from the press zone 13 and be transferred into the calibration zone 14 in the form of towed oil, i.e. oil towed along by the endless bands.

It is however also possible to supply the calibration zone 14 via a conduit 12 with further lubricant oil, however not a lubricant oil which stands under a hydrodynamic pressure. A second heat exchanger 20 permits heating the hydrostatically provided lubricant in line 12, independently of any heating in the hydrodynamically provided lubricant in line 9 in the press zone 13. The heating of lubricant in line 12 by heat exchanger 20 may be required to minimize local temperature shock.

The provision of press zones which stand under hydrodynamic pressure and optionally under reduced hydrodynamic pressure and a press zone at the output side which stands under hydrostatic pressure also makes it possible to provide differentiated temperature loading of these individual zones by the supply of differentially heated or optionally indeed even cooled lubricant oil. In this manner one can in turn meet the requirements for the particular product that is to be manufactured in the best possible manner by setting the respective pressure and temperature parameters along the length of the press.

In the drawing the reference numerals 15 show the individual hydraulic rams which are used to provide the actual working pressure of the press, i.e. to press the press platen 2 downwardly towards the fixed press platen 1. As can be seen the hydraulic rams 15 bear at their lower ends against a force transmitting rail 16 provided on and above the press platen 2 and with their other ends against a frame 17 which surrounds the two press platens 1 and 2. In practice a frame such as 17 is also provided on the other side of the endless bands, i.e. behind the frame 17 shown in the plane of the drawing and further rams are interposed between this further frame and a further rail member 16 on the platen 2. Hydraulic pressure is supplied to the rams via the duct 18. The duct 12 with the supplied lubricant under only static pressure can communicate directly with a body of lubricant held in a container with the level of lubricant in the container being kept constant by a float system, in similar manner to the float system of a carburetor or oil stove so that a steady static head of pressure is present in the line 12 and thus in the press zone 14.

What we claim is:

1. A continuously operating press for the pressing of a web of material comprising at least one layer of a finely divided material with a binder dispersed therein, the press having a press zone at an input side thereof and a calibration zone at an output side thereof and comprising a lower press platen with a surface and an upper press platen with a surface confronting said surface of said lower press platen; means for adjusting the relative positions of said press platens and for urging them towards each other;

a first endless band guided around said lower platen; a second endless band guided around said upper platen; means for driving said first and second endless bands at the same speed through said press zone and said calibration zone; and an arrangement for building up and maintaining a film of a lubricant between said confronting platen surfaces and the respectively associated endless bands, said arrangement comprising means for holding said lubricant under a predeterminable hydrodynamic pressure in at least said press zone disposed at said input side of the press and means for maintaining said lubricant at least substantially under only static pressure in said calibration zone.

2. A press in accordance with claim 1, wherein said means for maintaining said lubricant at least substantially under only static pressure in the calibration zone comprises means for forming said lubricant film as a towed oil film from lubricant supplied at least in part from said press zone.

3. A press in accordance with claim 1, wherein said means for holding said lubricant under a predeterminable hydrodynamic pressure comprises means for pumping said lubricant in an at least substantially closed circuit.

4. A press in accordance with claim 3, wherein said lubricant which is supplied to said calibration zone and which stands at least substantially under only static pressure is supplied separately from said lubricant pumped around said closed circuit.

5. A press in accordance with claim 1, wherein that at least one further press zone is provided between the first said press zone standing under hydrodynamic pressure at said input side of said press and said calibration zone at said output side of said press and has a reduced hydrodynamic pressure in comparison to the hydrodynamic pressure in the first said press zone.

6. A press in accordance with claim 1, wherein a boundary is present between press zone and said calibration zone, and wherein means is provided for changing the position of said boundary by controlling the supply of said lubricant to said press zone and said calibration zone.

7. A press in accordance with claim 1, wherein said lubricant used to generate said hydrodynamic pressure is heated to exert a thermal surge on the press material running into the press.

8. A press in accordance with claim 1, wherein means is provided for supplying differentially heated lubricating oil to said press and calibration zones.

* * * * *